(No Model.) 2 Sheets—Sheet 1.
F. O. MATTHIESSEN & O. H. KRAUSE.
APPARATUS FOR CEMENTING GRANULATED SUGAR INTO BLOCKS.
No. 318,640. Patented May 26, 1885.
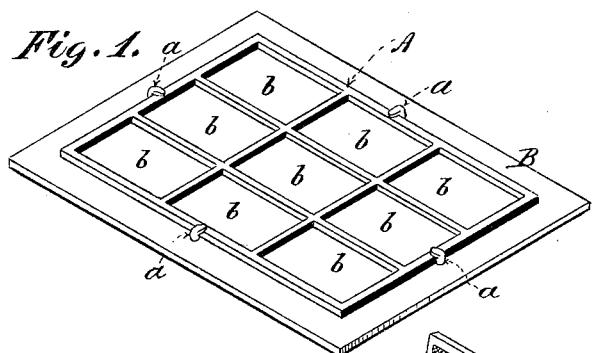
Fig. 1.
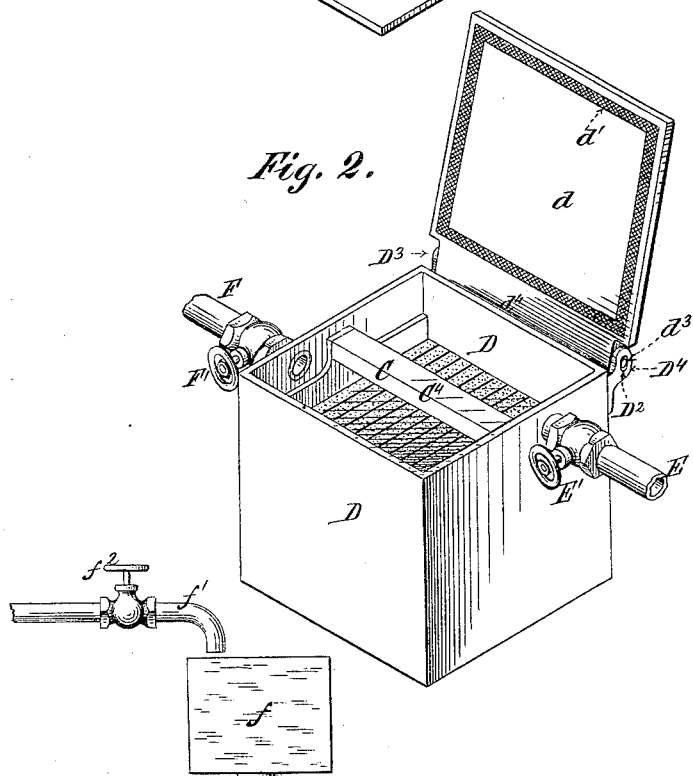
Fig. 2.
Fig. 3.
Witnesses:
M. L. Adams.
R. C. Howes.
Inventors:
Franz O. Matthiessen,
Otto H. Krause,
Per Edw. E. Zimmy,
Atty.

(No Model.) 2 Sheets—Sheet 2.
F. O. MATTHIESSEN & O. H. KRAUSE.
APPARATUS FOR CEMENTING GRANULATED SUGAR INTO BLOCKS.
No. 318,640. Patented May 26, 1885.
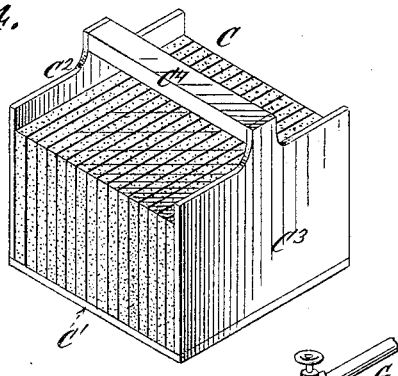
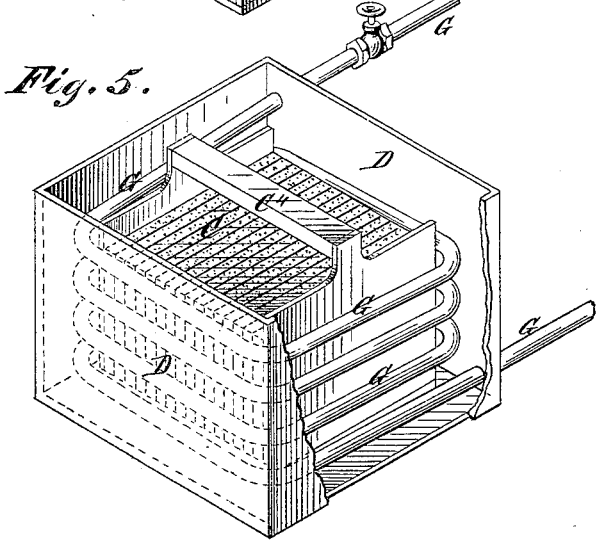
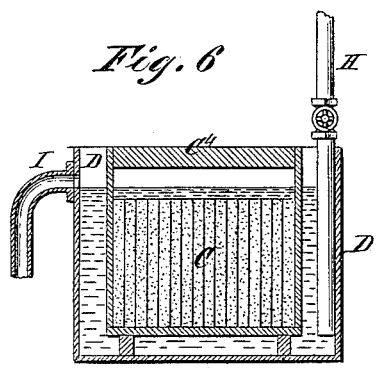

UNITED STATES PATENT OFFICE.

FRANZ O. MATTHIESSEN, OF IRVINGTON, NEW YORK, AND OTTO H. KRAUSE, OF JERSEY CITY, NEW JERSEY.

APPARATUS FOR CEMENTING GRANULATED SUGAR INTO BLOCKS.

SPECIFICATION forming part of Letters Patent No. 318,640, dated May 26, 1885.

Application filed April 21, 1885. (No model.)

*To all whom it may concern:*

Be it known that we, FRANZ O. MATTHIESSEN, of Irvington, New York, and OTTO H. KRAUSE, of Jersey City, New Jersey, have invented certain improvements in apparatus for cementing granulated sugar into blocks by the cementation to each other of the particles of sugar contained in a lightly-compacted cake, tablet, or prism of soft sugar or granulated sugar, or mixtures of soft sugar and granulated sugar, of which the following is a specification.

This apparatus is intended for employment in carrying out the process of manufacturing soft sugar or granulated sugar into hard sugar described in the pending application of F. O. Matthiessen, serially numbered 156,881, and filed February 24, 1885.

The apparatus embraces—

First. A suitable mold or molds for molding the soft sugar or granulated sugar into cakes, prisms, or tablets of the desired dimensions.

Secondly. A box provided with a removable air-tight cover, and connected by means of a suitable pipe with an air-pump or vacuum-chamber, and by another pipe with a reservoir for containing a concentrated hot pure sugar solution, or so-called "white-liquor." This box is the charging-box, and is intended to contain the cakes, tablets, or prisms of sugar while they are being charged with concentrated hot white-liquor.

Thirdly. A frame composed of a bottom plate, two uprights, and a cross-piece at the top to serve as a handle, which frame fits into the charging-box, and is adapted to hold a prescribed number of cakes or tablets of sugar placed side by side.

Fourthly. A cooling-tank for containing a concentrated cold white-liquor to serve as a bath, in which the cakes of sugar charged with the hot white-liquor are immersed after removal from the charging-box. To keep the concentrated cold white-liquor at the desired low temperature, the tank containing it may be provided with a coil of pipe, through which there is kept in circulation a liquid supplied by refrigerating apparatus such as is commonly employed for cooling refrigerating-rooms in which meat is stored; or a concentrated cold white-liquor may be kept in circulation through the tank into which it is introduced for the purpose of serving as a bath, and may be supplied from a reservoir in which it is cooled by contact with chilling-surfaces; or the cooling-tank may be provided with a jacket through which a circulation of cooling-fluid is kept up; or it may be placed in a larger tank and kept surrounded by cold liquid.

The accompanying drawings, illustrating apparatus embodying the invention, are as follows: Figure 1 is an isometrical perspective showing a simple form of molding apparatus. Fig. 2 is an isometrical perspective of the charging-box uncovered, showing the frame and the cakes of sugar deposited within it. Fig. 3 is a vertical section of the charging-box, showing the cover down. Fig. 4 is an isometrical perspective of the frame containing the cakes of sugar removed from the charging-box. Fig. 5 is an isometrical perspective of the cooling-tank, with a portion of its front wall broken away for the purpose of more fully exhibiting the interior coil of pipe, through which a refrigerating-liquid is intended to be circulated. Fig. 6 is an isometrical perspective representing a modification of the cooling-tank, in which the interior coil of pipe is dispensed with, and provision is made for the continuous circulation of concentrated cold white-liquor, supplied from a reservoir in which the cold white-liquor is maintained at a low temperature by contact with chilling-surfaces.

It will of course be understood that the forms and dimensions of the molds will be varied according to the forms and dimensions of the cakes, prisms, or tablets which it is desired to produce.

The molding device illustrated in Fig. 1 is intended for the production of cakes twelve inches long, eight inches wide, and, say, five-eighths of an inch thick. It consists, substantially, of a frame, A, like a window-sash, which is placed upon a flat plate, B, whereon it is held in position by means of the clamping-buttons *a a*, or by any other convenient means. When thus placed in position, there are presented upon the plate nine cavities, each indicated by the letter *b*, each twelve inches by eight, and five-eighths of an inch deep, five-eighths of an inch being the thickness in a vertical direction of the strips of which the frame is made.

The sugar which is to be operated upon, which may be soft sugar or slightly-moistened granulated sugar, or a mixture of soft sugar and granulated sugar, as the case may be, is distributed in the cavities b b b b b b b b and lightly compacted therein, and the plate B is then introduced into an oven and subjected to a temperature of, say, 140° for a suitable length of time, until the sugar deposited in the said cavities becomes so caked together that the cakes can be handled without breaking. The plate is then removed from the oven, and the frame A being detached, the cakes can then be removed from the plate and deposited side by side in the frame C, composed, as will be seen, of the bottom plate, C', and of the two standards $C^2$ $C^3$, and the cross-bar $C^4$ at the top, uniting the upper parts of the standards, and serving the purpose of a handle, by means of which the frame can be lifted. The frame C, having been filled with cakes of sugar, is then deposited in the charging-box D, and the cover d, provided upon its under side with the rubber gasket d', is then placed upon the top of the box.

A pipe, E, introduced into the side wall of the box near the top, connects it with an air-pump or vacuum-chamber, and is provided with the valve E'. By opening the valve E' after the cover has been placed upon the box, air is exhausted from the interior of the box and a partial vacuum is established. The valve E' is then closed, and a supply of concentrated hot white-liquor is introduced into the interior of the box through the pipe F by opening the valve F'. The pipe F is connected, preferably, with an elevated measuring-chamber, f, of comparatively small dimensions, for containing the quantity of concentrated hot white-liquor required for a single charge, the quantity required being supplied by means of the pipe f' from a reservoir of concentrated hot white-liquor. The pipe f' is provided with a valve, $f^2$, by closing which the supply of hot white-liquor from the reservoir is shut off.

The cover d is loosely hinged to the back of the box by means of the laterally-projecting trunnions $d^2$ $d^3$, which enter the vertical slots D' $D^2$, formed, respectively, in the ears $D^3$ $D^4$, cast upon or otherwise affixed to the rear upper corners of the box. The edge of the cover between the trunnions $d^2$ $d^3$ is provided with the extension $d^4$, which, when the cover is raised, bears against the rear side of the box, and thus prevents the cover from falling backward, and holds it in a position in which it is slightly inclined backward, so that it will remain stationary by its own gravity.

So far as the charging-box is concerned, the only essential conditions are that it shall be provided with a movable tight-fitting cover, and that pipe-connections shall be provided, either with the box or with the cover, by means of which air may be exhausted from the box, and after such exhaustion the concentrated hot white-liquor may be introduced into the box.

The cooling-tank for containing a bath of concentrated cold white-liquor may be made just large enough to contain one of the frames; or it may be made large enough to contain any desired number of frames.

The frames and the sugar they contain, when they are removed from the charging-box, are hot, and of course communicate their heat to the concentrated cold white-liquor in which they are immersed. To counteract this heating effect and keep down the temperature of the white-liquor bath, the cooling-tank may be provided with an interior coil of pipe, G, extending around its side walls, as shown in Fig. 4, and connected with suitable refrigerating apparatus and means for forcing a refrigerating-liquid through the coil; or the coil may be dispensed with, and the cold white-liquor may be kept in constant circulation through the cooling-tank. In the latter case the cold white-liquor may be supplied by means of the pipe H from an elevated reservoir, in which the white-liquor is maintained in contact with chilling-surfaces.

By means of the pipe I the overflowing white-liquor from the cooling-tank is conducted to a well, from which it may be pumped back into the elevated reservoir.

The only essential conditions of the cooling apparatus are that means shall be provided for keeping down the temperature of the cold white-liquor and counteracting the heating effect of the frames and cakes of sugar when they are first immersed in the cooling-bath.

What is claimed as the invention is—

1. The herein-described apparatus for employment in manufacturing soft sugar or granulated sugar, or mixtures of soft sugars and granulated sugars, into cakes, tablets, or prisms of hard sugar, the same embracing, essentially, the following devices, to wit: first, a molding device for molding soft sugar or granulated sugar into cakes, tablets, or prisms of the desired form and dimensions preparatory to baking such cakes, tablets, or prisms in a suitable oven; secondly, a suitable frame adapted to contain a prescribed number of cakes, tablets, or prisms, and provided with a handle, by means of which it can be lifted; thirdly, a charging-box adapted to receive the said frame and provided with a removable tight-fitting cover, and connections, by means of pipes provided with suitable valves, respectively, with an air-pump or vacuum-chamber and with a reservoir for supplying the hot white-liquor; and, finally, a cooling-tank for containing a bath of concentrated cold white-liquor, and means for keeping down temperature of the cold white-liquor in the cooling-tank after the frames containing the hot charged cakes of sugar are deposited therein.

2. Apparatus substantially such as herein described for charging soft sugar or granulated sugar, or mixtures of soft and granulated sugars, with hot white-liquor, the said apparatus consisting of a box or receptacle for said soft sugar or granulated sugar, or mixtures thereof, and a removable cover adapted to bear
5 upon and make a tight joint with the open top or end of the box or receptacle, and connections, by means of pipes provided with suitable valves, respectively, with an air-pump or vacuum-chamber and a reservoir for supplying hot white-liquor.

F. O. MATTHIESSEN.
    O. H. KRAUSE.

Witnesses:
 D. M. VAN VORST,
 ROBT. MOELLER.